United States Patent Office 3,740,388
Patented June 19, 1973

3,740,388
PREPARATION OF CARBOXYALKYL DERIVATIVES OF POLYGALACTOMANNANS
Rex Montgomery, Iowa City, Iowa, and George F. Bateson, Minneapolis, John D. Corcoran, Wayzata, and Le Roy O. Krbechek, Minneapolis, Minn., assignors to General Mills, Inc.
No Drawing. Filed June 11, 1970, Ser. No. 45,545
Int. Cl. C07c 47/18
U.S. Cl. 260—209 R                 4 Claims

ABSTRACT OF THE DISCLOSURE

Carboxyalkyl ethers of polygalactomannans are prepared by forming an alcohol-water slurry thereof along with a halo fatty acid reactant and an alkali metal hydroxide. The alcohol is a monohydric alcohol of 2 to 4 carbon atoms, preferably isopropyl alcohol. The products are useful as thickening agents when complexed with calcium ions.

---

The present invention relates to an improved process for preparing derivatives of polygalactomannans. More particularly, it relates to such a process wherein polygalactomannans are reacted with certain halo fatty acid reactants in the presence of an alkali metal hydroxide and an alcohol containing solvent system.

It has recently been discovered that carboxalkyl ethers of polygalactomannans having a D.S. of 0.6 to 2.0 can be mixed with small amounts of calcium salt or materials yielding calcium ions, thereby greatly increasing the effectiveness of said carboxyalkyl ethers. Other divalent cations such as Mg, Ba or Sr were found to have little or no effect on the thickening or gelling properties of the polygalactomannans after carboxyalkylation. The described high D.S. carboxyalkyl ethers of the galactomannan gums-calcium complexes find use in the formation of fibers and as thickening agents for various other products. The fibers can be impregnated with serums comprising binders, flavoring and coloring agents and the like to yield products simulating natural meats—i.e., meat analogs can be produced.

Prior to the present invention the high D.S. carboxyalkyl ether derivatives of the polygalactomannans were prepared by a preferred procedure wherein a dry blend of the polygalactomannan (i.e., guar flour) and a halo fatty acid reactant (i.e., sodium chloroacetate) was sprayed with an appropriate amount of an alkali metal hydroxide (i.e., sodium hydroxide). This resulted in a viscous dough media which was difficult to agitate and in which it was difficult to insure uniformity. Additionally, temperature control was a problem and the mixture tended to agglomerate. These large size particles resulted in poor extraction efficiency and the product would often contain occluded salt and other impurities.

We have now discovered that many of the above-defined difficulties can be overcome by carrying out the reaction of the polygalactomannan and halo fatty acid reactant (in the presence of an alkali metal hydroxide initiator) in an alcohol-water solvent slurry. The use of such a slurry provides a relatively uniform fluid which eliminates agitation and heat transfer problems to a great degree. Because the galactomannan gum is maintained in a solid suspended state throughout the reaction period, the resulting carboxyalkyl product is in substantially the same physical state as the gum starting material. This finely divided physical state leads to more uniform substitution and greatly enhances extraction of salts therefrom.

By degree of substitution (D.S.) as used herein is meant the average substitution of carboxyalkyl ether groups per anhydro sugar unit. In guar, for example, the basic unit of the polymer is comprised of two mannose units with a glycosidic linkage and a galactose unit attached to one of the hydroxyls of the mannose units. On the average, each of the sugar units has three available hydroxyl sites. A D.S. of 3 would mean that all of the available hydroxyl sites had reacted to form carboxyalkyl ether. A D.S. of 1 would mean that one-third of the available hydroxyls had reacted.

The term "polygalactomannans" as used herein includes the general class of polysaccharides containing both galactose and mannose units. The polygalactomanns are usually found in the endosperm sections of leguminous seeds such as guar, locust bean, honey locust, flametree and *Cassia occidentalis*. The invention has particular value in providing improved derivatives of guar gum due to the ready availability of the same.

As indicated, the polygalactomannan is reacted with a halo fatty acid reactant which may be the acid per se or an alkali metal salt thereof. Suitable halo fatty acids include chloracetic acid, chloropropionic acid, chlorobutyric acid and the like. The said halo fatty acids can have 2 to 4 carbon atoms in the fatty chain and the halo group is preferably in the $\alpha$ position. It is preferred to use the sodium salts of the halo fatty acids and sodium chloroacetate is the particularly preferred reactant.

Sufficient halo fatty acid reactant is used to yield the product having the desired D.S. of 0.6 to 2.0. Using the preferred sodium chloroacetate and guar gum, the amounts of reactants can be expressed as from about 0.4 to 3.5 equivalents of the former to 100 grams of the latter. In terms of parts by weight, about 55 to 400 and preferably 90 to 200 parts of sodium chloroacetate would be used for each 100 parts of the guar flour.

And as also indicated above, the reaction of the halo fatty acid reactant and the polygalactomannan is carried out in the presence of an alkali metal hydroxide. Such hydroxide functions as a reaction initiator by reaction with the available hydroxyl groups of the polygalatomannan. The resulting alcoholate groups are then capable of reaction with the halo fatty acid reactant. As such, it is preferred to use a slight excess of the alkali metal hydroxide but, in any event, it is desirable to use at least about the same equivalents thereof per 100 grams of the polygalactomannan as the equivalents of the halo fatty acid reactant. In parts by weight, it is preferred, for example, to use 20 to 140 parts sodium hydroxide to 100 parts guar gum.

In accordance with our invention, an alcohol-water solvent system is used to form a reaction slurry with the polygalactomannan, halo fatty acid reactant and alkali metal hydroxide. The alcohols useful in preparing such a system are monohydric alcohols of 2 to 4 carbon atoms. The preferred such alcohol is isopropyl alcohol. Other of these alcohols such as ethanol, n-propanol and tertiary butanol, are also useful but are more costly than isopropyl alcohol. Sufficient water is included in the solvent system to at least slightly swell the galactomannan gum but too much water will swell the gum so much that filtration will be difficult. It is thus preferred to use solvent systems containing up to about 40% by weight water and more preferably from about 15 to 40% by weight water.

The alcohol-water solvent system will be present in an amount sufficient to form a fluid slurry of the reactants. Preferably, the alcohol-water solvent system will be used in an amount of about 3 to 10 times the weight of the polygalactomannan.

The reaction time is not critical although it is desirable to complete the reaction in a reasonable period—i.e. in less than about five hours and more preferably in ½ to 2 hours. Additionally, at the lowest water levels, the reaction should be terminated prior to the point where the pH of the reaction mixture drops much below 7.0. It is also preferred to carry out the reaction at temperatures of 45 to 80° C. Temperatures much above 80° C. should ordinarily be avoided because of the possibility of excessive alkali degradation of the polygalactomannan.

At the completion of the reaction period, the reaction mixture may be filtered and dried. However, it is preferred to wash the filtered product with aqueous methanol to remove salts (i.e. NaCl, sodium glycolate and the like). The washed product can then be dried and finds use in preparation of calcium complexes thereof. It is often desirable to also add an acid, such as acetic, HCl or the like, to effect neutralization of the product and bring the pH thereof to near 7.0. Such neutralization preferably takes place prior to the drying of the product.

The calcium derivatives of carboxyalkyl ethers of galactomannan gums having a D.S. of 0.6 to 2.0 are disclosed and claimed in the application of Yueh and Schilling, Ser. No. 8,440, filed Feb. 3, 1970, now Pat. No. 3,679,658. As indicated, such calcium derivatives are useful thickeners for a variety of food products and in the preparation of fibers which can then be constructed into meat analogs if desired.

The following examples serve to illustrate preferred embodiments of the invention without being limiting.

EXAMPLE I

Four hundred ml. of technical isopropyl alcohol and 100 gm. of guar flour were charged to a Waring Blender and agitated for a few minutes to form a uniform slurry. To this slurry was added 60 ml. of water containing 36 gm. of sodium hydroxide. Immediately following the addition of the base, 100 gm. of finely divided sodium chloroacetate was added over a 5-minute period. Although there was no temperature control, mechanical agitation, heats of solution, and heat of reaction caused the temperature to rise from room temperature to approximately 60° C. by the end of the 45-minute reaction period. The reaction mixture was filtered, and the product was extracted three times with 80 wt. percent methanol-water solvent at a 2 to 1 wt. ratio of solvent to product. The resulting yellow, powdery product had a D.S. of 0.87 and a salt content (NaCl, sodium glycolate) of 0.99%. To determine the D.S. in this example and the examples to follow, the ash content of the modified polygalactomannan was determined according to American Association of Cereal Chemists, method 08–01, Cereal Laboratory Methods, 7th Ed., 1962. Upon determination of the ash content, conventional analytical calculations can be used to obtain the D.S. However, to simplify the determination, a plot was prepared as follows and the D.S. determined.

| D.S.: | Calculated ash percent |
|---|---|
| 0.25 | 6 |
| 0.5 | 11 |
| 0.75 | 15.4 |
| 1.0 | 19 |
| 1.25 | 22.1 |
| 1.75 | 27.3 |
| 2.0 | 29.5 |

EXAMPLE II

A 2 liter, three neck flask equipped with a Heller propeller stirrer and a thermowell was charged with 190 ml. $H_2O$ and 400 ml. technical isopropyl alcohol. One hundred grams of guar flour was added to this solvent followed by the addition over a five-minute period of 80 gm. of 50% by weight aqueous sodium hydroxide. After ten minutes, 116 gm. of finely divided sodium chloroacetate was added over a ten-minute period. The resulting slurry was heated to approximately 60° C. and maintained at this temperature for the 45-minute reaction period. The reaction mixture was then filtered and the resulting product was washed four times with 1025 ml. of 75 wt. percent methanol-water solvent. During the fourth wash, the pH of the solvent was adjusted to 7.0 by the addition of 1 N HCl. The resulting white (acid treated) product had a D.S. of 1.07 and a NaCl level of 0.02%.

EXAMPLE III

A 30 gallon glass-lined Pfaudler reactor was charged with 78 lbs. technical isopropyl alcohol and 37 lbs. distilled water. Twenty pounds of guar flour was added to this solvent system and the resulting suspension was agitated until a relatively uniform slurry was obtained. Then over a ten-minute period, 22.4 lbs. of 50% by weight aqueous sodium hydroxide was added. After ten minutes 40 lbs. of finely divided sodium chloroacetate was added over a 15-minute period. The reaction temperature was then maintained at 55–60° C. for 1½ hours. Adequate mixing was maintained during the reaction period. The reaction mixture was then centrifuged through a De Laval desludge. Sixty pounds of the product were re-slurried four times in 120 lbs. of 75 wt. percent methanol-water solvent. During the fourth wash, the pH of the solution was adjusted to approximately 7.0 with concentrated HCl. The resulting product had a D.S. of 1.20 and a NaCl level of 0.7 wt. percent.

One percent (1.0%) by weight of aqueous solutions were prepared from the sodium carboxymethyl guar product of Example III and a similar product having a D.S. of 1.1 made by the prior process using no alcohol and dry blending of the sodium chloroacetate with the guar. The Brookfield viscosities (Brookfield Model HAT Selectoelectric Viscometer operated at 20 r.p.m.'s.) of the solutions at 25° C. were measured. In addition, the Brookfield viscosities of corresponding sols of calcium complexes (prepared by adding 3.0 ml. of 2 molar calcium chloride to 230 ml. of the 1% sodium carboxymethyl-guar solutions) were also measured at various temperatures. The results were as follows:

| | | Viscosity (cps.) | |
|---|---|---|---|
| Product | Temp., °C. | Na salt | Calcium complex |
| Example III D.S. 1.2) | 25 | [1] 780 | [2] 33,000 |
| | 35 | | [2] 20,000 |
| | 70 | | [3] 18,800 |
| | 82 | | [3] 12,000 |
| Prior procedure (D.S. 1.1) | 25 | [1] 270 | [4] 9,300 |
| | 38 | | [4] 5,200 |
| | 48 | | [4] 4,200 |
| | 60 | | [4] 3,200 |
| | 78 | | [4] 1,800 |

[1] Viscosity measured using Spindle #3.
[2] Spindle #7.
[3] Spindle #5.
[4] Spindle #4.

From the above data, it is apparent that the products prepared according to the process of the present invention have greater thickening properties than similar products prepared by a prior procedure. In addition, the resulting thickened fluids have much better clarity indicating better uniformity of the products prepared in accordance with the invention.

The products find special uses as thickening agents for foods at levels of 0.1 to 1.0% by weight, for example, wherein calcium ions are also present such as by the addition of a suitable calcium salt—i.e., calcium citrate, calcium chloride, etc. The calcium salt is used in an amount sufficient to cause the products to give increased viscosity and thickening to the food products.

The embodiments of the invention in which an exclusive property or privilege is claimed are defined as follows:

1. In the process of preparing carboxyalkyl ethers of polygalactomannans having a D.S. of 0.6 to 2.0 wherein the polygalactomannan is reacted with a halo fatty acid reactant selected from halo fatty acids of 2 to 4 carbon atoms and the alkali metal salts thereof using an alkali metal hydroxide reaction initiator, the improvement consisting of carrying out the reaction using an alcohol-water solvent system in an amount sufficient to form a fluid slurry of the reactants, said alcohol being a monohydric alcohol of 2 to 4 carbon atoms and said solvent system containing from about 15 to 40% by weight water.

2. The process of claim 1 wherein the polygalactomannan is guar gum, the halo fatty acid reactant is sodium chloroacetate, the alkali metal hydroxide is sodium hydroxide and the alcohol is isopropyl alcohol.

3. The process of claim 2 wherein the sodium chloroacetate and sodium hydroxide are used in amounts of about 0.4 to 3.5 equivalents per 100 grams of the guar gum.

4. The process of claim 3 wherein the reaction product is washed with a methanol-water solvent and neutralized with an acid.

References Cited

UNITED STATES PATENTS

| | | | |
|---|---|---|---|
| 2,520,161 | 8/1950 | Moe | 260—209 R |
| 2,868,780 | 1/1959 | Minkema | 260—234 R |

LEWIS GOTTS, Primary Examiner

J. R. BROWN, Assistant Examiner